United States Patent
Mos (10) Patent No.: US 11,022,741 B2
(45) Date of Patent: Jun. 1, 2021

(54) LUMINAIRE COMPRISING A SURFACE TILE AND A LIGHTING DEVICE

(71) Applicant: SIGNIFY HOLDING B.V., Eindhoven (NL)

(72) Inventor: Barry Mos, Bocholt (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/957,351

(22) PCT Filed: Dec. 18, 2018

(86) PCT No.: PCT/EP2018/085518
§ 371 (c)(1),
(2) Date: Jun. 23, 2020

(87) PCT Pub. No.: WO2019/134822
PCT Pub. Date: Jul. 11, 2019

(65) Prior Publication Data
US 2020/0348460 A1   Nov. 5, 2020

(30) Foreign Application Priority Data

Jan. 2, 2018   (EP) .................................... 18150006

(51) Int. Cl.
*F21V 8/00*   (2006.01)
(52) U.S. Cl.
CPC .................. *G02B 6/001* (2013.01)
(58) Field of Classification Search
CPC .... G02B 6/001; G02B 6/0011; G02B 6/0078; G02B 6/0031; G02B 6/0046
See application file for complete search history.

(56) References Cited

U.S. PATENT DOCUMENTS

| 10,371,884 B2 * | 8/2019 | Ninan .................. G02B 6/0068 |
| 2001/0016105 A1 | 8/2001 | Sugiyama et al. |

(Continued)

FOREIGN PATENT DOCUMENTS

| EP | 2530503 A1 | 12/2012 |
| WO | 2012168839 A1 | 12/2012 |

(Continued)

*Primary Examiner* — Anabel Ton
(74) *Attorney, Agent, or Firm* — Daniel J. Piotrowski (57) ABSTRACT

A luminaire (1) is disclosed that comprises a surface tile (5) and a lighting device (10), wherein the lighting device (10) is arranged proximal to an edge of the surface tile (5). The lighting device (10) comprises a light guide (100) having an elongate surface arrangement (110) extending between opposing end surfaces (120, 120'), and a light source (20) at one of the end surfaces (120, 120') of the light guide (100) and arranged to emit its luminous output into the light guide (100) through said end surface (120, 120'). The elongate surface arrangement comprises a first surface portion (111) and an opposing second surface portion (113). The first surface portion (111) comprises a first light outcoupling structure (130) dimensioned to generate a first illumination profile (135) from the second surface portion (113) that has a first angular distribution, and a second light outcoupling structure (130') spatially separated from the first outcoupling structure (130) and dimensioned to generate a second illumination profile (135') from the second surface portion (113) that is spatially distinct to the first illumination profile (135) and has a second angular distribution. The first illumination profile (135) and the second illumination profile (135') illuminate different regions of the surface tile (5) and in combination provide a uniform illumination of the surface tile (5).

13 Claims, 9 Drawing Sheets

(56) References Cited

U.S. PATENT DOCUMENTS

| | | |
|---|---|---|
| 2010/0002461 A1 | 1/2010 | Wu et al. |
| 2010/0033988 A1 | 2/2010 | Chiu et al. |
| 2014/0049959 A1* | 2/2014 | Lee .................... G02B 19/0066 362/235 |
| 2014/0268865 A1 | 9/2014 | Matthew |
| 2016/0077272 A1 | 3/2016 | Lu |
| 2016/0372100 A1 | 12/2016 | Mason et al. |

FOREIGN PATENT DOCUMENTS

| | | |
|---|---|---|
| WO | 2015079675 A1 | 6/2015 |
| WO | 2017151299 A1 | 9/2017 |

* cited by examiner

LUMINAIRE COMPRISING A SURFACE TILE AND A LIGHTING DEVICE

CROSS-REFERENCE TO PRIOR APPLICATIONS

This application is the U.S. National Phase application under 35 U.S.C. § 371 of International Application No. PCT/EP2018/085518, filed on Dec. 18, 2018, which claims the benefit of European Patent Application No. 18150006.7, filed on Jan. 2, 2018. These applications are hereby incorporated by reference herein.

FIELD OF THE INVENTION

The present invention relates to a luminaire comprising a surface tile and a lighting device that is arranged proximal to an edge of the surface tile to illuminate the surface tile, wherein the lighting device has a light guide and a light source for emitting its luminous output into the light guide via an end surface of the light guide.

BACKGROUND OF THE INVENTION

With the advent of solid state lighting (SSL), e.g. LED lighting, light guides are increasingly being used in lighting devices to shape the output of such SSL elements. Light guides have a number of attractive properties that have contributed to their popularity in lighting devices. For example, the use of a light guide provides a form of indirect lighting where the light sources used to inject light into the light guide are obscured from direct view, thereby aiding the prevention of glare experienced by a person looking directly at such a lighting device. In addition, light guides work as mixing chambers in which spatially separated components of the luminous output of such light sources are mixed. Hence, light sources such as LEDs may be used that suffer from colour over angle separation of the spectral components of the luminous output of the LED, as such spatial colour separation will be rectified by the mixing within the light guide. Consequently, relatively cheap light sources may be used with such light guides in which the often costly optical measures to alleviate such colour over angle artefacts have been omitted.

A light guide typically has an elongate shape into which light is injected through one or both of its end surfaces, with the surface arrangement extending between the two end surfaces typically acting as a total internal reflection surface arrangement from which an injected light ray can only escape if its angle of incidence onto a surface region exceeds the critical angle at which the total internal reflection condition no longer holds. To this end, a light guide typically comprises an arrangement of light outcoupling structures on its surface arrangement that disrupt the total internal reflection by increasing the angle of incidence on an opposing surface section of a light ray that interacts with such a light outcoupling structure.

An example of such a light guide is disclosed in US 2016/0077272 A1, which discloses alight guide that is centered on an optical axis and includes a plurality of light extracting structures next to and spaced apart from each other. Each structure includes a surface that extends from a first side of the light guide and is adapted to extract light that propagates in a first direction along the optical axis from an opposite second side of the light guide by reflecting the propagating light toward the second side. The surface makes an angle with the optical axis that is less than 45 degrees and greater than 10 degrees.

However, it is difficult with such a light guide to achieve a homogeneous illumination of a large surface area, in particular a non-square surface area where the light guide is positioned along a short side of the surface area. This for example is problematic in surface tile illumination, such as in suspended ceilings, large area ceiling covering tiles and so on, where it is important for aesthetic reasons to achieve such a homogeneous illumination.

SUMMARY OF THE INVENTION

The present invention seeks to provide a luminaire according to the opening paragraph that can produce a more homogeneous luminous distribution across the surface tile.

According to an aspect, there is provided a luminaire comprising a surface tile and a lighting device, wherein the lighting device is arranged proximal to an edge of the surface tile. The surface tile may for example be an acoustic surface tile, or any other type of surface tile, such as a tile for use in a (suspended) ceiling. The lighting device comprises a light guide having an elongate surface arrangement extending between opposing end surfaces. The lighting device further comprises a light source at one of the end surfaces of the light guide and arranged to emit its luminous output into the light guide through said end surface. The elongate surface arrangement of the light guide comprises a first surface portion and an opposing second surface portion. The first surface portion carries a plurality of light outcoupling structures each extending in the elongation direction of the surface arrangement and being spatially separated from each other, said plurality of light outcoupling structures including a first light outcoupling structure and a second light outcoupling structure. The first light outcoupling structure is dimensioned to generate a first illumination profile from the second surface portion that has a first angular distribution; and the second light outcoupling structure is dimensioned to generate a second illumination profile from the second surface portion that is spatially distinct to the first illumination profile and has a second angular distribution. The first illumination profile and the second illumination profile illuminate different regions of the surface tile and in combination provide a uniform illumination of the surface tile.

The present invention is based on the insight that the angular distribution of an illumination profile generated with an elongated light outcoupling structure on the light guide is not constant in terms of luminance but rather exhibits variations in the luminance that are a function of a distance of the illuminated surface area from the light guide. Consequently, by providing a plurality of spatially separated light outcoupling structures, e.g. at least a first light outcoupling structure and a second outcoupling structure that each extend in the elongation direction of the light guide and that are spatially separated from each other, a luminous distribution can be generated with the light guide in which the spatial variations in the luminance across a surface area illuminated with such a luminaire can be reduced. Further light outcoupling structures, e.g. a third light outcoupling structure is dimensioned to generate a third illumination profile from the second surface portion that has a third angular distribution that is spatially distinct to the first illumination profile and the second illumination profile, and so on, may be added to the plurality of spatially separated light outcoupling structures on the light guide.

To this end, the first illumination profile and the second illumination profile preferably are at least partially overlapping such that luminance troughs in the first illumination profile are compensated by luminance peaks in the second illumination profile (and vice versa) to improve the homogeneity of the luminance across the illuminated surface.

In order to shape each illumination profile, each of the first light outcoupling structure and the second light outcoupling structure may be individually selected from a paint line having a given width and a given colour, a pattern of paint dots having a given width and a given colour, a textured surface region having a given width and a prismatic structure comprising a body having a given width and height, the body comprising a multi-faceted end surface having a given angle between surface facets. The dimensions and shapes of the light outcoupling structures typically cause the generation of an illumination profile having a particular intensity and angular distribution, such that by controlling such dimensions, e.g. the width of a (dotted) paint line or textured surface or the width, height and/or given angle of a prismatic structure can be controlled to control the characteristics of the illumination profile generated therewith.

Where a (patterned) paint line is used as one or more of the light outcoupling structures, the colour of the paint may be white such that all spectral components of the light injected into the light guide are included in the illumination profile generated by that particular light outcoupling structure, such that a lighting device including the light guide according to this embodiment produces white light. Alternatively, the paint line may have a different colour such that the illumination profile generated by that particular light outcoupling structure has the colour of the paint used for that particular light outcoupling structure.

In a preferred embodiment, the first light outcoupling structure is different to the second light outcoupling structure such that the respective illumination profiles generated by these light outcoupling structures are different at least in terms of their respective angular distributions. To this end, the first light outcoupling structure and the second light outcoupling structure have different shapes and/or different dimensions. This is particularly useful in scenarios in which a first of the illumination profiles has a non-periodic variation in its luminance generated across a surface area illuminated by the illumination profile, such that this non-periodic variation may be compensated by the second illumination profile in order to yield a more homogenous luminance across this surface area.

In one embodiment, the light guide has a circular cross-section, which has the advantage that the light guide can be manufactured in a particularly cost-effective manner, e.g. through extrusion or the like, with the further advantage that the shape of the first and second illumination profiles are independent of the position of the first and second light outcoupling structures on the surface arrangement of the light guide. Also, a light guide having a circular cross-section, e.g. a cylindrical or toroidal light guide, produces light with a high quality of collimation. It is furthermore stipulated for the avoidance of doubt that in this embodiment, the surface arrangement of the light guide comprises a single continuous surface extending between its end surfaces.

In an alternative embodiment, the first surface portion is a planar surface portion and the second surface portion is a curved surface portion. Such a surface arrangement for example may be achieved with a light guide having a U-shaped cross-section, which has the advantage that application of the first and second light outcoupling structures on the planar surface portion is straightforward. However, the first and second light outcoupling structures on the planar surface portion must be correctly positioned on the planar surface portion in this embodiment as the beam shape of the first and second illumination profiles are dependent on the position of the first and second light outcoupling structures on the planar surface section. It is furthermore stipulated for the avoidance of doubt that in this embodiment, the surface arrangement of the light guide comprises a discontinuous surface extending between its end surfaces.

The light guide may have any suitable shape. For example, the light guide may be linear or curved, e.g. have a cylindrical shape or a toroidal shape in case of a light guide having a circular cross-section. Other cross-sectional shapes of the light guide, e.g. rectangular cross-sections or other polygonal cross-sections, elliptical cross-sections and so on, equally may be contemplated.

The lighting device of the luminaire is capable of producing a highly homogeneous illumination profile across the surface tile to be illuminated by the lighting device. Moreover, as the light source one or more solid-state lighting elements such as a single LED or an array of LEDs, or a COB (Chip-On-Board) LED may be used in which optical elements to address optical artefacts such as colour over angle artefacts may be omitted due to the light mixing characteristics of the light guide.

The lighting device may further comprise a reflective member such as a white reflector, a mirror, a reflective foil or coating and so on at the other of said end surfaces such that light injected into the light guide by the light source at the opposite end of the light guide is reflected back into the light guide, thereby improving the optical efficiency of the lighting device as light losses at the end surface where the reflective member is positioned are minimized. The reflective member may contact the other of said end surfaces or may be spatially separated therefrom.

Alternatively, the lighting device may comprise a further light source at the other of said end surfaces of the light guide that is arranged to emit its luminous output into the light guide through said other end surface. In this embodiment, light is injected into the light guide from both its end surfaces, such that a lighting device may be realized capable of generating a high luminous flux.

In the luminaire, the lighting device is arranged proximal to an edge of the surface tile such that the first illumination profile and the second illumination profile illuminate different regions of the surface tile. Such a luminaire may implement a light panel, more particularly a large area light panel having an area in the region of 1 $m^2$ or larger, where the lighting device can achieve a uniform illumination of the surface area of the light panel owing to the arrangement of light outcoupling on its light guide as previously explained. As already mentioned, the surface tile may be an acoustic surface tile.

The luminaire may comprise a reflective back plate bordered by a plurality of side walls defining a cove housing the (acoustic) surface tile, wherein the lighting device is arranged along one of said side walls. If the surface tile is an acoustic surface tile, such a cove light panel combines excellent acoustic dampening with excellent luminous efficiency and homogeneity due to the light generated by the lighting device entering the acoustic surface tile being reflected by the reflective back plate.

The luminaire in some embodiments comprises a pair of said lighting devices arranged along opposing side walls to further improve the homogeneity of the illumination of the exposed surface of the (acoustic) surface tile.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
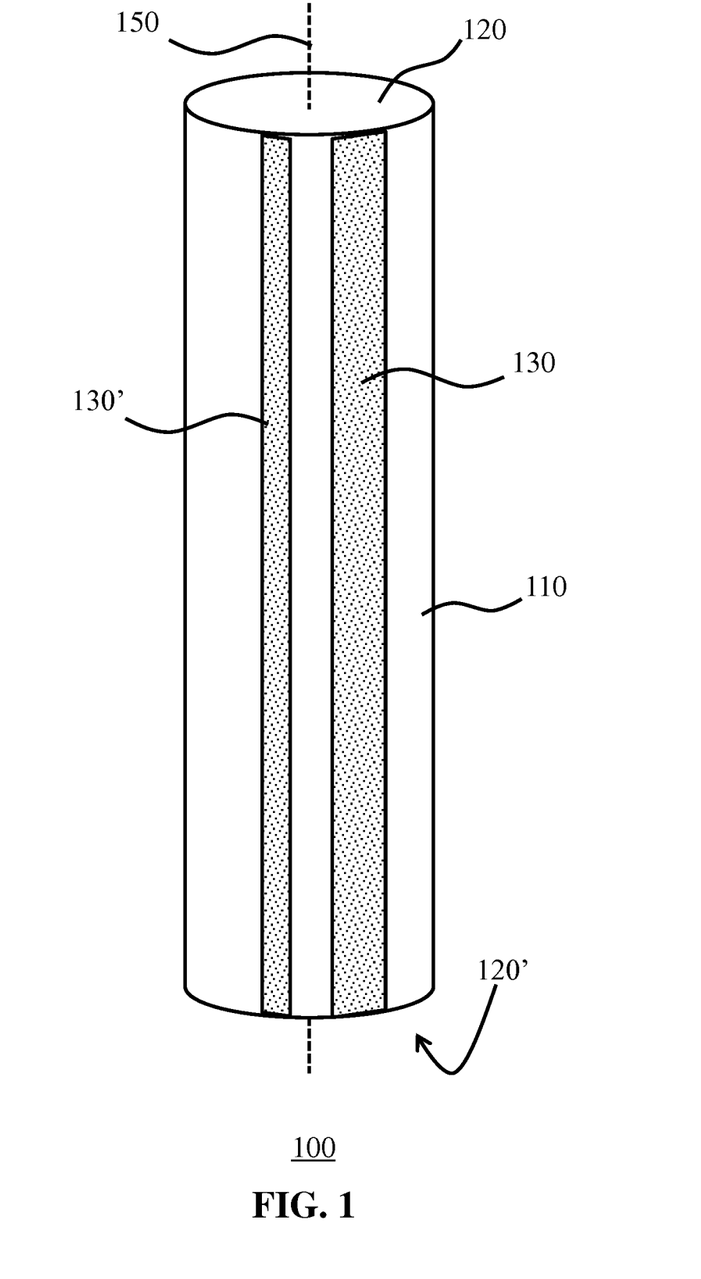
FIG. 1 schematically depicts a perspective view of a light guide for use in the luminaire of the invention.
Figure 2:
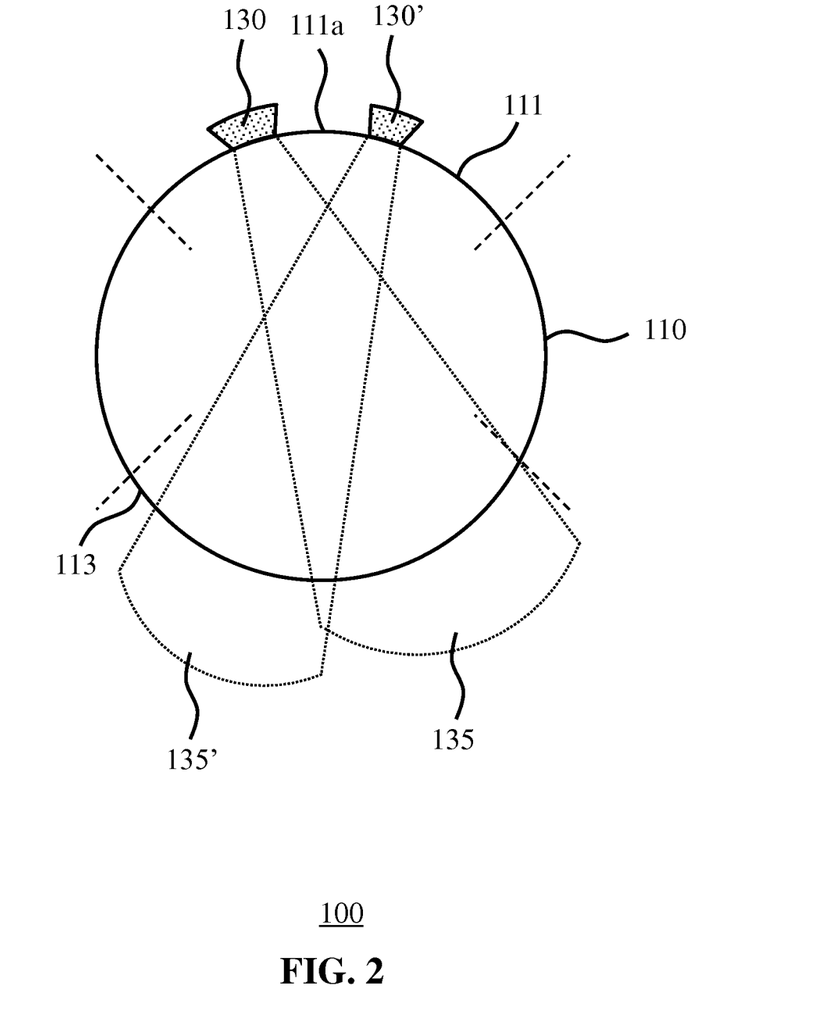
FIG. 2 schematically depicts a cross-sectional view of a light guide for use in the luminaire of the invention.

FIG. 1 schematically depicts a perspective view and FIG. 2 schematically depicts a cross-sectional view of a light guide 100 for use in a luminaire according to an example embodiment of the present invention. The light guide 100 typically comprises an elongated surface arrangement 110 extending between opposing end surfaces 120, 120' of the light guide 100, i.e. along its longitudinal axis 150 defining the elongation direction of the elongated surface arrangement 110.

In the context of the present application, a surface arrangement is an arrangement of one or more continuous surface sections of the light guide 100, in which each of these surface sections extends between the opposing end surfaces 120, 120'. Where the surface arrangement comprises a plurality of such continuous surface sections, neighboring surface sections are typically adjoined in a discontinuous manner, e.g. an such neighboring surface sections are joined under a non-zero angle such as a 90° angle in case of the light guide 100 comprising a rectangular cross-section delimited by four such surface sections. Alternatively, where the light guide 100 comprises a surface arrangement 110 consisting of a single continuous surface, the light guide 100 preferably has a circular cross-section although other continuous cross-sections such as an elliptical cross-section for example may also be contemplated.

In accordance with embodiments of the present invention, the surface arrangement 110 of the light guide 100 comprises a first surface section 111 in which a first outcoupling structure 130 and a second outcoupling structure 130' are located. The first outcoupling structure 130 and the second outcoupling structure 130' are spatially separated from each other by a portion 111a of the first surface section 111, with each of the first outcoupling structure 130 and the second outcoupling structure 130' extending in the elongation direction of the light guide 100, i.e. in parallel with its longitudinal axis 150. The first outcoupling structure 130 is arranged to couple out a first illumination profile 135 from a further surface section 113 opposing the first surface section 111, whereas the second outcoupling structure 130' is arranged to couple out a second illumination profile 135' from the further surface section 113.

Each of the first illumination profile 135 and the second illumination profile 135' have an angular distribution, i.e. beam spread angle, in a direction perpendicular to the longitudinal axis 150 of the light guide 10. Typically, the first illumination profile 135 is spatially distinct from the second illumination profile 135' at least when projected onto a surface to be illuminated. In the context of the present application, two illumination profiles are spatially distinct when they are not perfectly overlapping. For example, the first illumination profile 135 and the second illumination profile 135' may be non-overlapping or may be partially overlapping.

In particularly advantageous embodiments, the first illumination profile 135 and the second illumination profile 135' are partially overlapping such that one of the illumination profiles compensates for intensity variations of the other illumination profile when projected onto a surface, thereby creating a more homogeneous luminance emanating from such a surface, as will be explained in more detail below. This for example may be achieved by the first illumination profile 135 having a wider angular distribution than the second illumination profile 135', wherein the second illumination profile 135' is projected onto the projection of the first illumination profile 135 in order to provide such compensation. Many other configurations are of course equally feasible, such as for example a configuration in which a wing of the first illumination profile 135 overlaps with a wing of the second illumination profile 135' at least when projected onto a surface to be illuminated to compensate for a tail-off of the luminous intensity at the wings of the angular distribution of the luminous profiles 135 and 135'.

Although the detailed description of the present application describes the presence of two such elongated outcoupling structures 130 and 130' on the surface arrangement 110 of the light guide 100, it should be understood that embodiments of the present invention are not limited to the presence of only two of such elongated outcoupling structures; any suitable number of such elongated outcoupling structures may be present on the surface arrangement 110 of the light guide 100 in order to homogenize the luminance across a surface to be illuminated with the use of the light guide 100 as explained in this application.

As will be understood from the foregoing, the light guide 100 may have any suitably shaped cross-section. In FIG. 2, the cross-section is circular, i.e. the light guide 100 may be cylindrical in case of a linear light guide 100 or toroidal in case of a curved light guide 100. This has the advantage that the light outcoupling structures 130 and 130' may be positioned anywhere on the surface arrangement 110 in order to achieve the desired luminous profiles 135 and 135', as the luminous profiles are only a function of the shape of the light outcoupling structures 130 and 130' respectively. Moreover, such light guides 100 are readily available although application of the light outcoupling structures 130 and 130' may be more involved than onto a planar surface.

Figure 3:
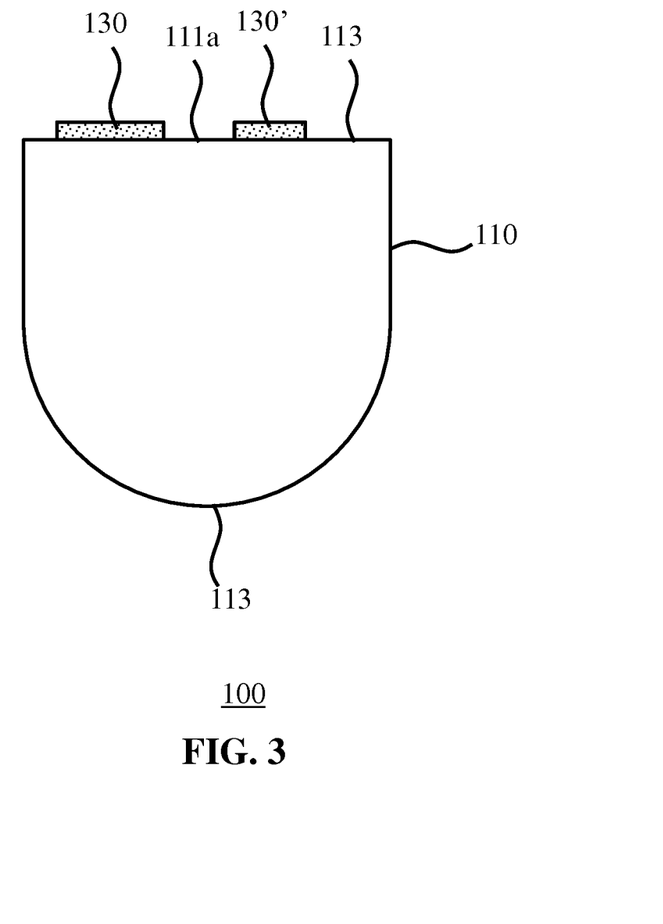
FIG. 3 schematically depicts a cross-sectional view of a light guide for use in the luminaire of the invention.

To this end, in an alternative example embodiment as schematically depicted in FIG. 3, the light guide 100 comprises a planar first surface section 111 onto which the first outcoupling structure 130 and the second outcoupling structure 130' are positioned in order to generate the luminous profiles 135 and 135' exiting the light guide 100 through the opposing curved surface section 113. In this embodiment, the application of the first outcoupling structure 130 and the second outcoupling structure 130' onto the planar first surface section 111 of the surface arrangement 110 is particularly straightforward, but the positioning of the first outcoupling structure 130 and the second outcoupling structure 130' on this surface section is now critical as the luminous profiles 135 and 135' are now a function of the position of the first outcoupling structure 130 and the second outcoupling structure 130' on the planar first surface section 111. It further has been found that a further advantage of a light guide 100 having a non-circular cross-section is that better light mixing is achieved within the light guide 100 compared to a light guide 100 having a circular cross-section, and that the likelihood of a light ray hitting one of the light outcoupling structures is increased, thereby increasing the optical efficiency of the light guide 100.

In the embodiments of the present invention, the light guide 100 may be made of any suitable material. Suitable materials include polymer materials such as polycarbonate, acrylates such as poly (methyl methacrylate), polyethylene terephthalate, and so on. Many other suitable materials will be readily available to the skilled person.

The angular distribution of the illumination profiles 135 and 135' may be controlled by the dimensions and shape of the first outcoupling structure 130 and the second outcoupling structure 130' respectively. Each of the light outcoupling structures may be realized in any suitable manner. For example, each of the light outcoupling structures may be realized as an elongated textured zone within the first surface section 111, which may be formed by chemical treatment (etching), laser treatment or sand blasting for example in order to create a roughened surface texture that can act as such a light outcoupling structure. The width (i.e. the dimension perpendicular to the elongation direction) of such an elongated textured zone typically controls the angular distribution of the illumination profile created with such a light outcoupling structure, with larger widths increasing the angular distribution of such an illumination profile.

Figure 4:
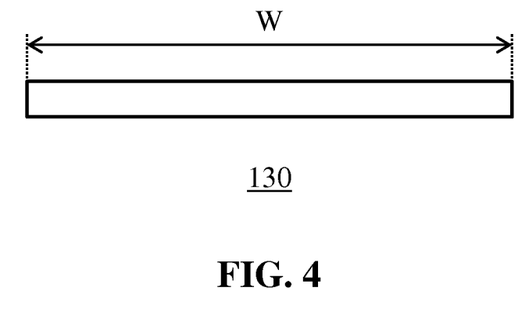
FIG. 4 schematically depicts a cross-sectional view of a light outcoupling structure according to an example embodiment.

Alternatively, as schematically depicted in FIG. 4, each of the light outcoupling structures may be realized as a paint line in which the width W (i.e. the dimension perpendicular to the elongation direction) of the light outcoupling structure 130, i.e. the paint line, controls the angular distribution of the illumination profile 135 generated by such a light outcoupling structure. The paint line may be a continuous paint line or a patterned paint line, e.g. defining a line of dots extending in the elongation direction of the light guide 100. Such a patterned paint line may assist in achieving a more homogeneous luminous output in the elongation direction of the light guide 100 in order to compensate for light decay effects across the light guide 100, as is well-known per se. Of course, a similar patterning may be deployed to other types of light outcoupling structures such as the previously described surface texture.

The paint used for the formation of such a paint line may be white paint in order to generate the emission of white light from the light guide 100 or alternatively the paint may be coloured paint such that the light emitted from the light guide 100, i.e. the illumination profile 135, adopts the colour of the paint, e.g. when a white light source is used to inject light into the light guide 100 through one of its end surfaces 120, 120'.

Figure 5:
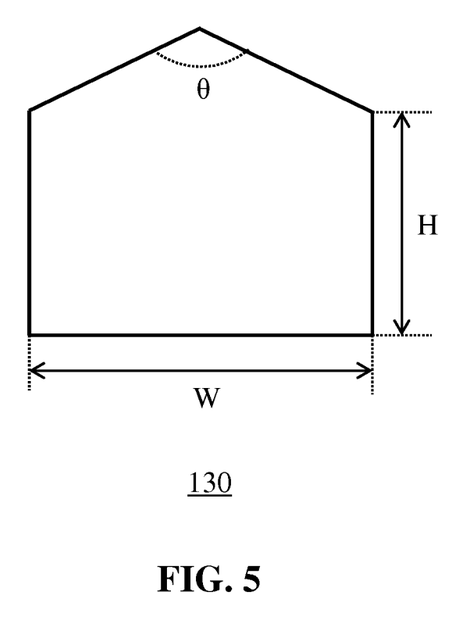
FIG. 5 schematically depicts a cross-sectional view of a light outcoupling structure according to another example embodiment.

In yet another example embodiment as schematically depicted in FIG. 5, each of the light outcoupling structures may be realized as an indented prism having prism walls extending from the first surface section 111 of the light guide 100 and having a multi-faceted end surface. Light entering such a prism are totally internally reflected by the prism walls, with the light being coupled out after being redirected by the multi-faceted prism end surface. In this embodiment, the width W of the prism and the angle θ between the surface facets may be controlled to control the angular spread of the illumination profile generated with such a light outcoupling structure 130, whereas the height H of the prism walls of the prism controls the fraction of light that is coupled out of the light guide 100 by such a light outcoupling structure 130, with a larger height H typically increasing this fraction. Such a prism may be formed in any suitable manner. For example, the prism can be made by diamond chiseling or lasering if the light guide 100 is extruded, or the prism can be incorporated into a mold in which the light guide 100 is (injection) molded.

Figure 6:
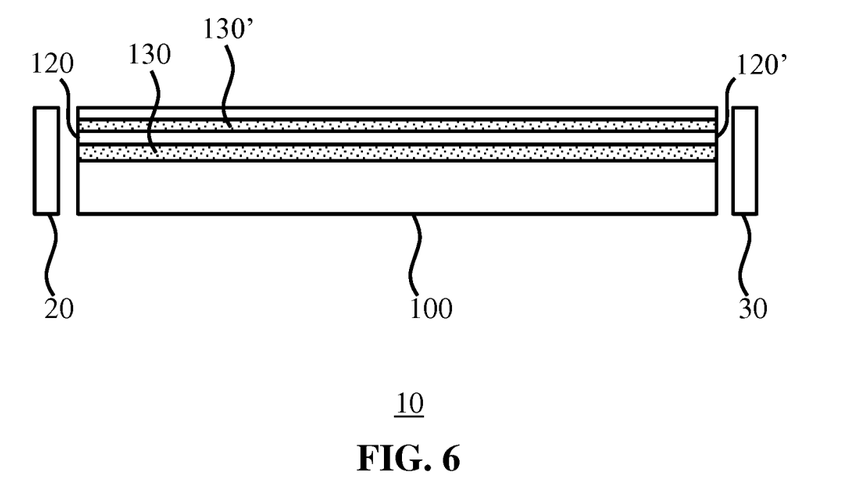
FIG. 6 schematically depicts a simulation of luminous profiles in cross-sectional view as generated with lighting devices having different light guides.

The control over the angular distribution of an illumination profile generated with the light guide 100 is further demonstrated in FIG. 6, which depicts the simulation results of the illumination profiles generated with a cylindrical light guide made of co-extruded polycarbonate having a diameter of 20 mm onto which a white line is painted in the elongation direction of the light guide. The white paint line has a reflection of 98%. In (a), a 0.8 mm wide white line was painted on the bottom of the light guide (in the 6 o'clock position). In (b), an 8.4 mm wide white line was painted on the bottom of the light guide (in the 6 o'clock position), whereas in (c) a 0.8 mm wide white line was painted on the bottom left of the light guide (in the 7.30 o'clock position). It is evident from these simulation results that the degree of collimation (i.e. the angular distribution) of the illumination profile generated by such a light outcoupling structure can be controlled by the dimension of the light outcoupling structure, whereas the direction in which the illumination profile is generated can be controlled by the position of the light outcoupling structure on the surface of the light guide. Consequently, by combining light outcoupling structures having different dimensions in different positions on the surface of the light guide, any desirable beam shape can be generated with the light guide in a straightforward manner.

It should be understood that the light guide 100 for use in a luminaire according to embodiments of the present invention may have any combination of such light outcoupling structures 130, 130', e.g. any combination of surface texture zones, continuous lines, patterned lines and/or indented prisms. In at least some of the embodiments of the present invention, the first light outcoupling structure 130 and the second outcoupling structure 130' are different to each other, e.g. have a different shape and/or different dimensions such that the first illumination profile 135 generated with the first light outcoupling structure 130 is different to the second illumination profile 135' generated with the second light outcoupling structure 130', e.g. in terms of angular distribution.

Figure 7:
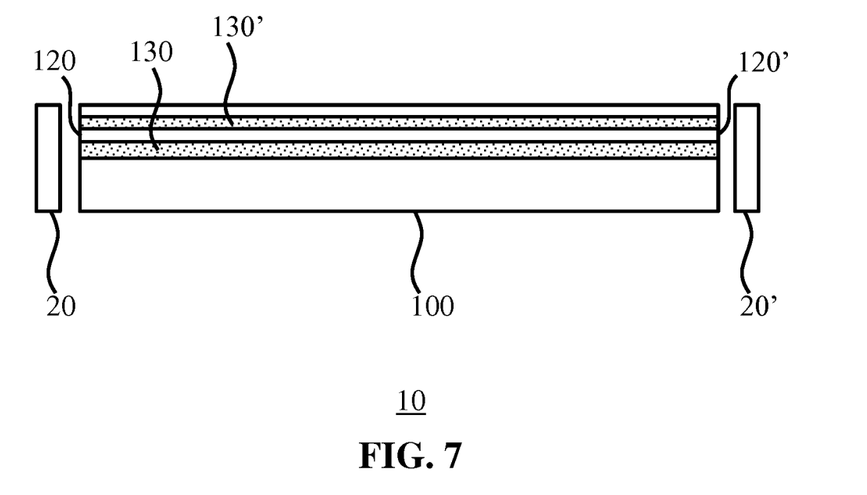
FIG. 7 schematically depicts a cross-sectional view of a lighting device for use in the luminaire of the invention.

FIG. 7 schematically depicts a lighting device 10 for use in a luminaire according to an example embodiment of the present invention. The lighting device 10 comprises the light guide 100 according to any of the embodiments as described above including the first light outcoupling structure 130 and the second light outcoupling structure 130'. It is noted for the avoidance of doubt that although it is schematically depicted in FIG. 7 that each of the first light outcoupling structure 130 and the second light outcoupling structure 130' extend over the full length of the surface of the light guide 100, i.e. extend from the first end surface 120 of the light guide 100 to the opposing end surface 120' of the light guide 100, by way of non-limiting example only. It has been previously explained that depending on the desired shape of the beam angle to be produced with the light guide 100, the first light outcoupling structure 130 and/or the second light outcoupling structure 130' may extend in the elongation direction of the light guide 100 over only a part of the full length of the surface arrangement 110 of the light guide 100.

In the lighting device 10 as shown in FIG. 7, a light source 20 is arranged proximal to the first end surface 120 of the light guide 100 such that the light generated with the light source 20 is coupled into the light guide 100 through the first end surface 120. Any suitable light source 20 may be used for this purpose, such as for example one or more solid state lighting elements, e.g. one or more LEDs, which may be arranged as an array of LEDs or as a COB LED device as previously explained. The luminous output of the light source 20 may have any suitable spectral composition, e.g. may be white light or may be coloured light. In case of a white light-producing light source 20, the light source 20 may suffer from optical artefacts such as colour over angle artefacts as such artefacts are typically nullified by the light guide 100 acting as a mixing chamber of the various spatial components of such a luminous output.

In order to prevent the light trapped in the light guide 100 from escaping from the light guide 100 from the opposing end surface 120', a reflective member 30 may be positioned proximal to this opposing end surface 120' such that light incident on this reflective member 30 is reflected back into the light guide 100. The reflective member may be any suitable reflective structure, e.g. a reflector, a mirror, a reflective foil or coating and so on. The reflective member 30 may contact the opposing end surface 120' or may be spatially separated therefrom.

Figure 8:
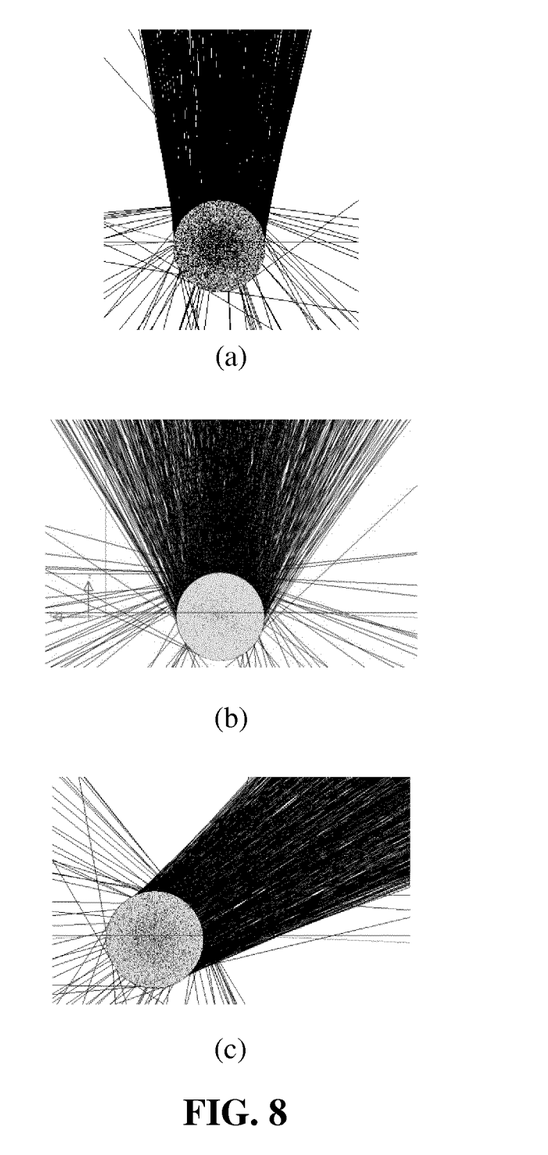
FIG. 8 schematically depicts a cross-sectional view of a lighting device for use in the luminaire of the invention.

Instead of a reflective member 30, a further light source 20' may be positioned proximal to the opposing end surface 120' as schematically depicted in FIG. 8 such that light is injected into the light guide 100 from both end surfaces 120, 120'. This yields a lighting device 10 having a higher luminous flux than the lighting device in FIG. 7. The light sources 20 and 20' may be the same light sources or may be different light sources, e.g. different types of LEDs.

One application domain in which such a lighting device 10 may be advantageously deployed is large area lighting, in which large surface areas, e.g. surface areas having an area in excess of 1 m², e.g. up to 10 m² or more, may have to be lit from the edge of the surface area. In such application domains, achieving a homogeneous illumination of the large area is particularly challenging, especially when deploying such a side-lit arrangement. Such a side-lit arrangement for example may be required where the large surface area has to perform a particular function such as acoustic dampening, as in such an application the surface itself should be made of acoustically absorbent materials, e.g. glass wool, foam, or the like, in order to achieve the desired acoustic dampening across this surface area. Due to the acoustically reflective nature of typical light guide materials, the light guide 100 of the lighting device 10 cannot be used to define (part of) the large surface area; rather, the lighting device 10 is arranged along an edge of such a large surface area such that the luminous output of the lighting device 10 is projected across the large surface area in order to give the large surface area an appearance of constant luminance across its surface to an observer.

Figure 9:
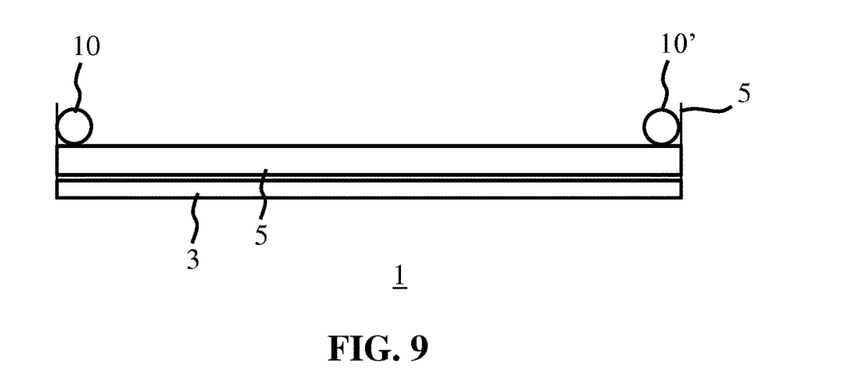
FIG. 9 schematically depicts a cross-sectional view of a luminaire according to an embodiment.

An example embodiment of a luminaire 1 for implementing such an acoustic function is schematically depicted in FIG. 9. The luminaire 1 comprises a light-reflective back panel 3 supporting an acoustic tile 5. Side walls 7 enclose the acoustic tile 5 and define a cove into which the acoustic tile 5 is fitted. A pair of lighting devices 10 and 10' according to any of the previously described embodiments of the present invention are mounted alongside opposing sidewalls 7 in a length direction of the luminaire 1 such that the luminous output of the light guides 100 of the lighting devices 10 and 10' are projected across the exposed major surface of the acoustic tile 5 in the width direction of the luminaire 1. Alternatively, one of the lighting device 10 and 10' may be omitted from the luminaire 1 in which case a single lighting device 10 is responsible for the illumination of the exposed major surface of the acoustic tile 5. Such a luminaire 1 for example may be a large area cove light panel incorporating an acoustic function.

Figure 10:
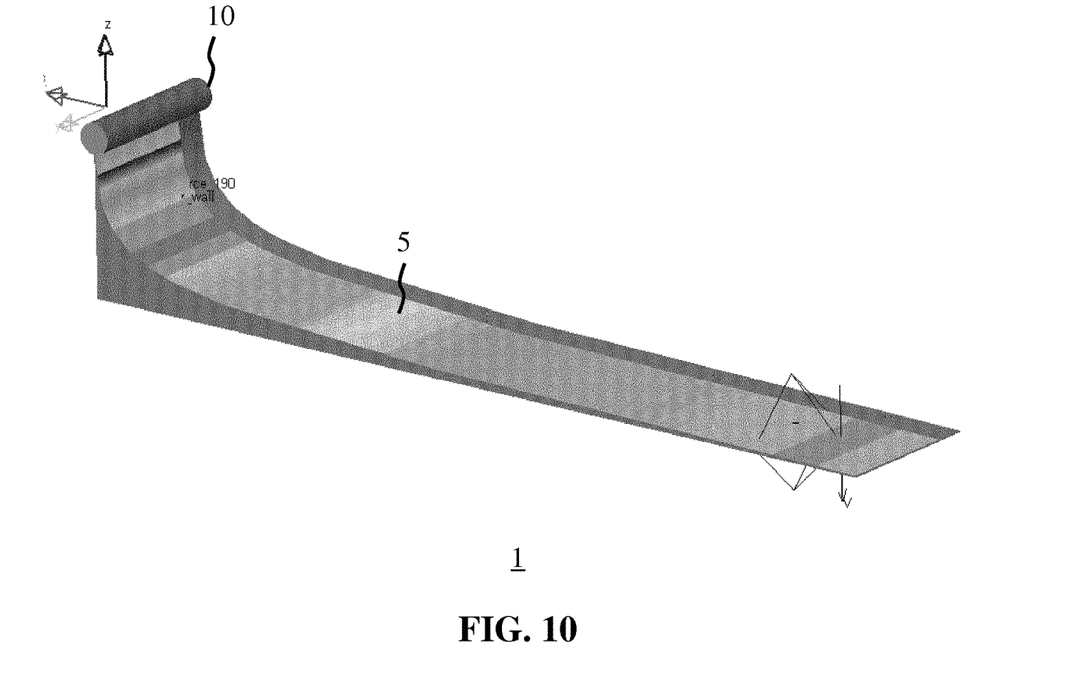
FIG. 10 schematically depicts a perspective view of a simulation model of such a luminaire.

It will now be demonstrated with the aid of optical simulations that the lighting device 10 for use in a luminaire according to embodiments of the present invention can achieve a more homogeneous illumination of the major surface of the acoustic tile 5 in such a luminaire 1 compared to a lighting device 10 having a single elongated light outcoupling structure. In these simulations, an optical model of the luminaire 1 as schematically depicted In FIG. 10 has been used, in which the acoustic tile is 120 cm wide and infinitely long. Only part of the length of the acoustic tile 5 is simulated by positioning a mirror at 60 cm from the lighting device 10 in the length direction of the acoustic tile 5. The acoustic tile 5 slopes upwardly proximal to the lighting device 10 for aesthetic reasons, i.e. to give the large area surface defined by the acoustic tile 5 a nicer appearance. As the light guide 100 in the lighting device 10, a cylindrical light guide made of co-extruded polycarbonate having a diameter of 20 mm onto which a white line is painted in the elongation direction of the light guide was used.

Figure 11:
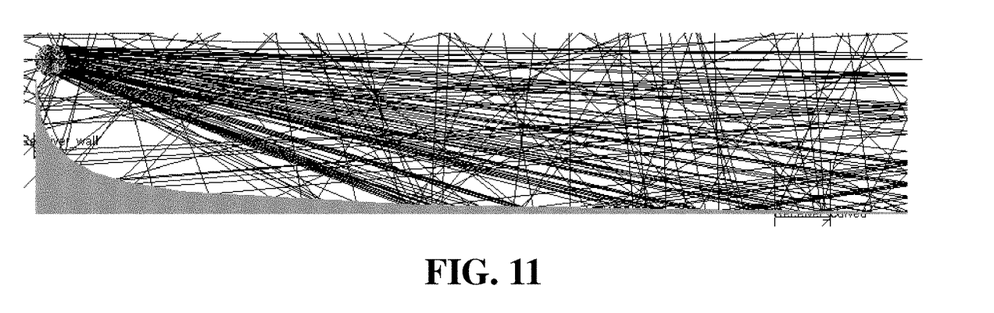
FIG. 11 schematically depicts a first simulation result of the simulation model including a light guide having a first outcoupling structure.
Figure 12:
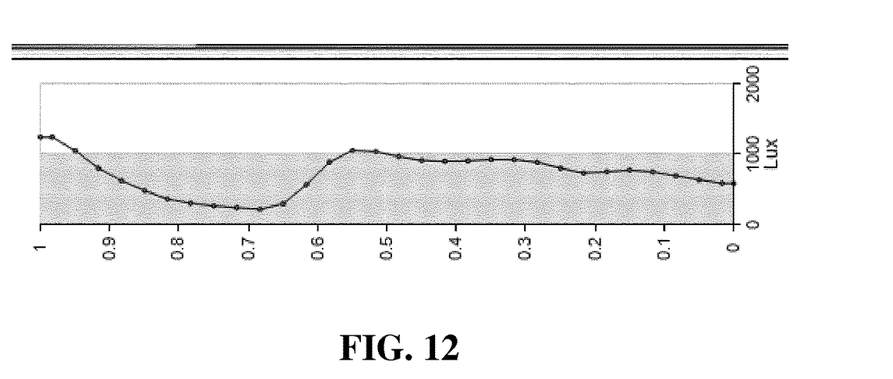
FIG. 12 is a graph depicting the luminous intensity distribution of the first simulation result along the x-coordinate of the simulation model.

FIG. 11 depicts the ray plot of the light rays emanating from the light guide 100 and FIG. 12 depicts the resulting luminance distribution across the major surface of the acoustic tile 5 in its length direction (i.e. perpendicular to the elongation direction of the light guide 100 of the lighting device 10). In this simulation, a white paint line having a width W of 0.9 mm was located on the surface arrangement 110 of the light guide 100 approximately in the 9.30 o' clock position on the surface arrangement 110. As can be seen from the graph in FIG. 12, the resulting illumination distribution across the surface of the acoustic tile 5 comprises a clear dip in luminous intensity from 0.9 to 0.6 on the x-axis of the graph, which translates into an undesirable inhomogeneity in the luminous intensity across this surface as perceived by an observer.

Figure 13:
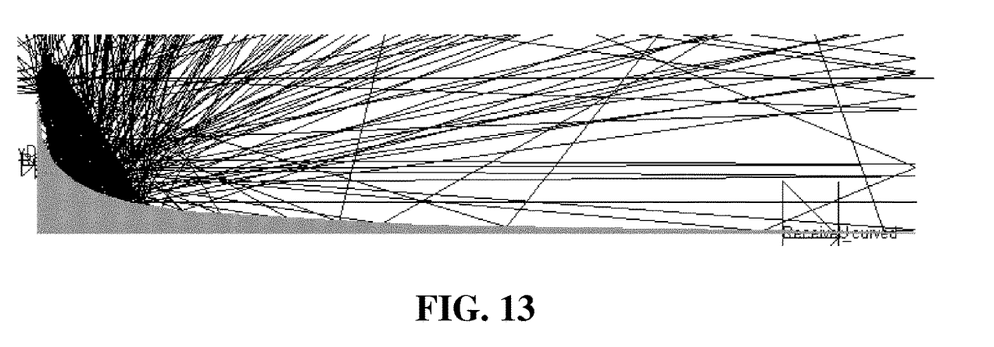
FIG. 13 schematically depicts a second simulation result of the simulation model including a light guide having a second outcoupling structure.
Figure 14:
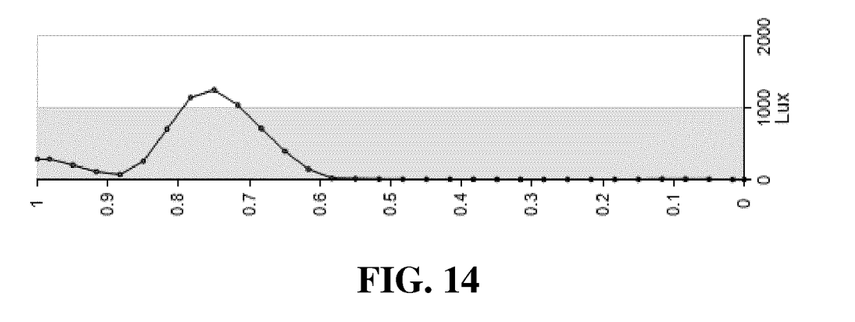
FIG. 14 is a graph depicting the luminous intensity distribution of the second simulation result along the x-coordinate of the simulation model.
Figure 15:
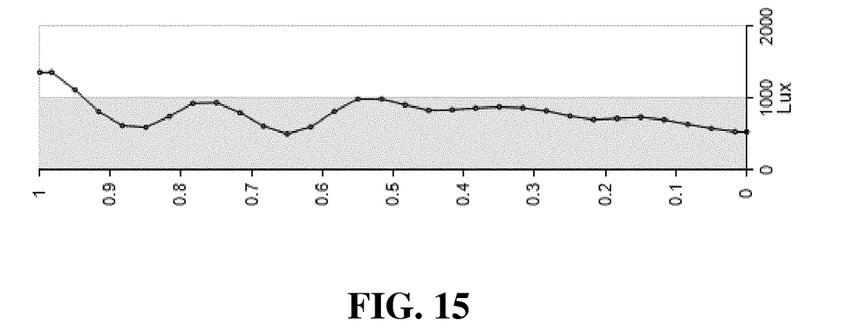
FIG. 15 is a graph depicting the luminous intensity distribution of a third simulation result along the x-coordinate of the simulation model using a light guide including both the first and second outcoupling structures.

In accordance with the principles of at least some embodiments of the present invention, a further light outcoupling structure is added to the light guide 100 to compensate this inhomogeneity. The dimensioning and positioning of such a further light outcoupling structure to achieve such compensation may be readily achieved using suitable optical simulation. In the present simulation example, a white paint line having a width W of 0.06 mm was positioned at around the 11 o'clock position on the surface arrangement of the light guide 100 of the lighting device 10, resulting in the ray plot of the light rays emanating from the light guide 100 as depicted in FIG. 13 and a luminance distribution across the major surface of the acoustic tile 5 in its length direction as depicted in FIG. 14, from which it can be observed that this particular light outcoupling structure in this particular location on the light guide 100 results in the surface region of the acoustic tile 5 from 0.9 to 0.6 on the x-axis of the graph being selectively illuminated by the illumination profile generated with this particular light outcoupling structure. Hence, when both these light outcoupling structures are present on the light guide 100 of the lighting device 10, a luminous distribution across the surface of the acoustic tile 5 as depicted in the graph of FIG. 15 is achieved, in which the inhomogeneity in the luminous distribution as depicted in the graph of FIG. 12 is largely compensated for by the addition of the second light outcoupling structure, thereby yielding the appearance of a more evenly lit surface of the acoustic tile 5. As will be readily understood by the skilled person, the homogeneity of such an illumination profile may be further improved by the addition of further light outcoupling structures to the light guide 100 of the lighting device 10 is desired or necessary. Hence the light guide 100 may carry any plurality of spatially separated elongated light outcoupling structures on its surface, which at least some of these light outcoupling structures having different shapes and/or dimensions to generate differently shaped illumination profiles that may at least partially overlap to homogenize the overall luminous output of a lighting device 10 and/or luminaire 1 comprising such a light guide 100.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire comprising a surface tile and a lighting device, the lighting device being arranged proximal to an edge of the surface tile, and the surface tile having a surface area equal to or greater than 1 m$^2$,
    wherein the lighting device comprises:
        a light guide having an elongate surface arrangement extending between opposing end surfaces, and
        a light source at one of the end surfaces of the light guide and arranged to emit its luminous output into the light guide through said end surface,
    wherein the elongate surface arrangement of the light guide comprises a first surface portion and an opposing second surface portion,
    wherein the first surface portion comprises a first light outcoupling structure and a second light outcoupling structure spatially separated from each other, each extending in the elongation direction of the elongate surface arrangement,
    wherein the first light outcoupling structure is dimensioned to generate a first illumination profile from the second surface portion that has a first angular distribution,
    wherein the second light outcoupling structure is dimensioned to generate a second illumination profile from the second surface portion that is spatially distinct to the first illumination profile and has a second angular distribution, and
    wherein the first illumination profile and the second illumination profile are projected across the surface area of the surface tile to illuminate different regions of the surface tile and in combination provide a uniform illumination of the surface tile.

2. The luminaire of claim 1, wherein the first illumination profile and the second illumination profile are at least partially overlapping.

3. The luminaire of claim 1, wherein the first light outcoupling structure and the second first light outcoupling structure are individually selected from a paint line having a given width and a given colour, a pattern of paint dots having a given width and a given colour, a textured surface region having a given width and a prismatic structure comprising a body having a given width and height, the body comprising a multi-faceted end surface having a given angle between surface facets.

4. The luminaire of claim 3, wherein the given colour of the paint line or the paint dots is white.

5. The luminaire of claim 1, wherein the first light outcoupling structure and the second light outcoupling structure have different shapes.

6. The luminaire of claim 1, wherein the first light outcoupling structure and the second light outcoupling structure have different dimensions.

7. The luminaire of claim 1, wherein the light guide has a circular cross-section.

8. The luminaire of claim 1, wherein the first surface portion is a planar surface portion and the second surface portion is a curved surface portion.

9. The luminaire of claim 1, wherein the light guide is linear or curved.

10. The luminaire according to claim 1, wherein the surface tile is an acoustic surface tile.

11. The luminaire of claim 1, wherein the lighting device further comprises a reflective member at the other of said end surfaces.

12. The luminaire of claim 1, wherein the lighting device further comprises a further light source at the other of said end surfaces of the light guide and arranged to emit its luminous output into the light guide through said other end surface.

13. The luminaire of claim 1, further comprising a reflective back plate bordered by a plurality of side walls defining a cove housing the surface tile, and wherein the lighting device is arranged along one of said side walls.

\* \* \* \* \*